United States Patent
Norrman et al.

(10) Patent No.: US 8,620,267 B2
(45) Date of Patent: Dec. 31, 2013

(54) IDENTIFICATION OF A MANIPULATED OR DEFECT BASE STATION DURING HANDOVER

(75) Inventors: Karl Norrman, Stockholm (SE); Bernard Smeets, Dalby (SE); Rolf Blom, Jarfalla (SE)

(73) Assignee: Telefonaktiebolaget L M Ericssion (publ), Stockholm (SE)

( * ) Notice: Subject to any disclaimer, the term of this patent is extended or adjusted under 35 U.S.C. 154(b) by 72 days.

(21) Appl. No.: 12/922,314

(22) PCT Filed: Aug. 25, 2008

(86) PCT No.: PCT/SE2008/050957
§ 371 (c)(1), (2), (4) Date: Nov. 19, 2010

(87) PCT Pub. No.: WO2009/120122
PCT Pub. Date: Oct. 1, 2009

(65) Prior Publication Data
US 2011/0059736 A1    Mar. 10, 2011

Related U.S. Application Data
(60) Provisional application No. 61/040,269, filed on Mar. 28, 2008.

(51) Int. Cl.
*H04M 1/66* (2006.01)
*H04W 24/00* (2009.01)
*H04W 36/00* (2009.01)

(52) U.S. Cl.
USPC ............ 455/410; 455/424; 455/436; 455/437

(58) Field of Classification Search
USPC .................. 455/410, 424, 436, 437
See application file for complete search history.

(56) References Cited

U.S. PATENT DOCUMENTS

2010/0190500 A1*   7/2010   Choi et al. ............... 455/436

FOREIGN PATENT DOCUMENTS

| CN | 1937840 A | 3/2007 |
|---|---|---|
| WO | WO 01/39538 A1 | 5/2001 |

OTHER PUBLICATIONS

International Search Report, PCT/SE2008/050957, Jan. 27, 2009.
International Preliminary Report on Patentability, PCT/SE2008/050957, Jul. 6, 2010.
Ericsson, "Bidding down attack at eNB to eNB active mode handover", 3GPP draft; SAWG3 Meeting #48, $3^{rd}$ Generation Partnership Project (3GPP), XP050280023, Jul. 10-13, 2007, 3 pp.

(Continued)

*Primary Examiner* — Meless N Zewdu
*Assistant Examiner* — Jean Chang
(74) *Attorney, Agent, or Firm* — Myers Bigel Sibley & Sajovec PA

(57) ABSTRACT

A method of and arrangement for detecting a manipulated or defect base station of a communication network is disclosed, wherein a target base station, having selected one or more algorithms on the basis of a prioritized algorithm list (PAL) and a UE security capabilities (SCAP), reports UE SCAP related information to a core network node. The core network node having knowledge of the UE SCAP compares this information or parts of this information with the retrieved UE SCAP related information in order to be able to identify a manipulated or defect base station when a comparison fails to match.

9 Claims, 6 Drawing Sheets

(56) References Cited

OTHER PUBLICATIONS

Nokia Corporation et al., "On Algorithms Negotiation and Bidding Down Attack";, 3GPP TSG SA WG3 Security-S3#49bis, 3$^{rd}$ Generation Partnership Project (3GPP); XP050268000, Dec. 11-13, 2007, 5 pp.

3GPP: "3$^{rd}$ Generation Partnership Project; Technical Specification Group Services and System Aspects; Rationale and track of security decisions in Long Term Evolved (LTE) RAN/3GPP System Architecture Evolution (SAE) (Release 8)", 3GPP Draft; TR 33.821 V.7., 3$^{rd}$ Generation Partnership Project (3GPP), XP050280548, Feb. 2008, 127 pp.

Chinese First Office Action Corresponding to Chinese Patent Application No. 200880128280.7; Date of Issue: Nov. 5, 2012; 11 Pages, English Translation.

\* cited by examiner

IDENTIFICATION OF A MANIPULATED OR DEFECT BASE STATION DURING HANDOVER

CROSS REFERENCE TO RELATED APPLICATIONS

This application is a 35 U.S.C. § 371 national stage application of PCT International Application No. PCT/SE2008/050957, filed on 25 Aug. 2008, which itself claims priority to U.S. provisional patent Application No. 61/040,269, filed 28 Mar. 2008, the disclosure and content of both of which are incorporated by reference herein in its entirety. The above-referenced PCT International Application was published in the English language as International Publication No. WO 2009/120122 A1 on 1 Oct. 2009.

TECHNICAL FIELD

The present invention relates to detection of manipulated or defect base stations in a cellular telecommunication network.

BACKGROUND

3GPP is currently standardizing the Long Term Evolution (LTE), which is the continuation of 3G networks. In LTE the ciphering and integrity protection of the user plane and the radio resource control data is performed by the base station, in this context usually referred to as the evolved Node B (eNB). When the communication link of a terminal, i.e., a User Equipment (UE), is handed over from one eNB to another eNB, the source eNB informs the target eNB about which algorithms that are supported by the UE and which algorithms that are allowed for use by the network. Out of the algorithms allowed by the network and supported by the UE and the target eNB, the target eNB then selects the algorithm that is considered to be the best, according to pre-defined selection criteria.

In such a situation, a compromised source eNB may modify the lists, indicating which algorithms the UE supports, which the network allows, and/or the priority order of the algorithms that the network supports. Since the target eNB has no possibility to verify the authenticity of these lists, it cannot detect if a malicious source eNB is tricking it into selecting a weak, and possibly even broken, algorithm. Such an attack set-up is typically referred to as a bidding-down attack.

The security working group in 3GPP has agreed to provide a solution for detection of this kind of bidding-down attack.

For the understanding of how present handover signaling can be organized such a procedure, according to the prior art, will now be described with reference to the signaling diagram of FIG. 1. The described handover signaling comply with the Technical Specification TS 36.300, "3$^{rd}$ Generation Partnership Project; Technical Specification Group Radio Access Network; Evolved Universal Terrestrial Radio Access (E-UTRA) and evolved Universal Terrestrial Radio Access Network (E-UTRAN); Overall description; Stage 2", May 2008, In a first step 1:1, a source eNB 101 configures UE measurement procedures according to the area restricted information. As indicated with steps 1:2 to 1:5, a UE 100 prepares for, and sends, a measurement report to the eNB 101 which it is currently attached to, i.e. the serving eNB which is called the source eNB in case of a handover situation, wherein UE 100 measures the strength of surrounding eNBs and reports the result. The serving eNB 101 decides to hand the UE 100 over to a selected target eNB 102, as indicated with a next step 1:6. Source eNB 101 then requests a handover from the target eNB, passing necessary information to a target eNB 102, as indicated with a next step 1:7. At this stage, the target eNB 102 may perform an admission control procedure, as indicated with another step 1:8, after which target eNB 102 accepts the request, as indicated with a step 1:9, and in response the source eNB 101 sends a handover command to the UE, which attaches to the target eNB and sends a handover confirm message to it, as indicated with another step 1:11. In subsequent steps 1:12-1:18 handover preparations, comprising e.g. synchronization, are executed between UE 100 and target eNB 102. When the target eNB 102 receives the handover confirm message sent in a step 1:19, it informs the Mobility Management Entity (MME) 104 in the core network about the new location of the UE 100, as indicated with a next step 1:20. In subsequent steps 1:21-1:28, the MME ensures that all data sent to, and received from, the UE 100 is now performed via the target eNB 102, as indicated in a final step 1:29.

According to the procedure described above, there is, however, no way for the MME 103 to verify that the information it received in the path switch request in step 1:20 is correct and trustworthy. There are currently two solutions under discussion in the security working group in 3GPP (SA WG3) for handling the problem mentioned above. One is provided in S3-080169 (P-CR) "AS algorithms selection mismatch indication" Nokia, Nokia Siemens Networks, 25-29 Feb. 2008. In short the solution described in this document suggests that, prior to executing a handover procedure, a UE is reporting its security capabilities to a Mobility Management Entity (MME), which in turn sends an allowed set of algorithms to the UE. The MME further sends a priority ordered list of algorithms, only containing algorithms supported by the UE, to the serving eNB, which selects one of these algorithms for use. If, during a handover procedure, the UE notices that the algorithm selected for use in the target cell is not included in the set of allowed algorithms, it reports this to the MME, the report including the cell identity (cell ID) of the first cell where the mismatch was detected. However, this method suffers from the problem that it is not possible for the target eNB or the UE to detect if the source eNB has modified the order of the algorithms in the networks list of allowed algorithms. Furthermore, the required reporting mechanism will be complex, since a new Non-Access Stratum (NAS) procedure, enabling the UE to report the described event to the MME, is required. Using this mechanism will also result in an increased load on the air interface between the UE and the target eNB.

Another solution to the same problem is proposed in S3-080054 "AS algorithm policy handling", Ericsson, 25-29 Feb. 2008, and consists basically of the following steps:

1. UE sends its UE security capabilities (UE SCAP), i.e. its supported algorithms, to the MME.
2. The MME selects a list of algorithms, here referred to as the MME_prio_list, in priority order.
3. The MME sends the MME_prio_list and the UE SCAP to the serving eNB.
4. The MME sends the MME_prio_list and the UE SCAP integrity protected to the UE.
5. The target eNB is configured via Operation and Maintenance (O&M) with a listed set of allowed algorithms, referred to as a O&M_allowed_set.
6. The target eNB selects an algorithm that can be identified in all three of the UE SCAP, MME_prio_list, and O&M_allowed_set.

7. The UE reports its MME_prio_list and the UE SCAP to the target eNB.
8. If the target eNB determines that the MME_prio_list and UE SCAP received from the UE are not the same as the ones received from the source eNB it can deduce that a bidding-down attack has occurred and can take appropriate action/s.

However, not only does this solution require a separate list of algorithms, configured in each eNB, since the UE has to provide information to the target eNB in a handover confirm command, it also increases the bandwidth usage on the established air link.

SUMMARY

It is an object of the present invention to address the problem at least some of the problems outlined above. More specifically it is an object of the invention to provide an improved procedure for detection of bidding-down attacks on security functions originating from a manipulated or defect base station.

According to one embodiment, a method in a base station of a communication network, acting as a target base station, for enabling detection of a manipulated or defect base station, acting as a source base station in connection with a handover of a user equipment is provided (UE; 300), wherein the method comprises the steps of:
  receiving a prioritized algorithm list (PAL) from the network, wherein the list is listing algorithms allowed for use when communicating with the UE in order of priority;
  receiving UE security capabilities (SCAP) related information from the source base station for the UE that is handed over from the source base station to the target base station;
  selecting at least one algorithm having the highest priority according to the PAL out of the algorithms being supported by the UE according to the UE SCAP related information and by the target base station, and
  reporting the received UE SCAP related information to a core network node that has knowledge of the UE SCAP of the UE, thereby enabling the core network node to use the UE SCAP related information for detection of a manipulated or defect base station.

A further aspect of the invention relates to a method in a core network node of a communication network for detection of a manipulated or defect base station, acting as a source base station, in connection with a handover of a user equipment (UE) to a target base station, wherein the method comprises the steps of:
  receiving and storing a Prioritized Algorithm List (PAL) from the network, wherein the list is listing algorithms allowed for the UE in order of priority;
  receiving and storing UE security capabilities (SCAP) from the UE;
  receiving, from the target base station, UE SCAP related information of the UE, where the UE SCAP related information has been reported from the source base station to the target base station previously during the handover procedure, and
  verifying the UE SCAP related information received from the target base station in order to detect a manipulated or defect base station by comparing at least part of the stored UE SCAP to the UE SCAP related information.

Yet another aspect of the invention relates to a base station of a communication network, capable of acting as a target base station, for enabling detection of a manipulated or defect base station, acting as a source base station, in connection with a handover of a user equipment (UE), wherein the base station comprises:
  receiving means for receiving a prioritized algorithm list (PAL) from the network, wherein the list is listing algorithms allowed for use when communicating with the UE in order of priority and for receiving UE security capabilities (SCAP) related information from the source base station for the UE that is handed over between the two base stations;
  selecting means (502) for selecting at least one algorithm from the PAL having the highest priority according to the PAL out of the algorithms being supported by the UE according to the UE SCAP related information and that is supported by the base station, and
  reporting means (503) for reporting the received UE SCAP related information to a core network node (200) that has knowledge of the UE SCAP of the UE via a transmitting means (504), thereby enabling the core network node to use the UE SCAP related information for detection of a manipulated or defect base station.

Still another aspect of the invention relates to a core network node of a communication network for detection of a manipulated or defect base station, acting as a source base station, in connection with a handover of a user equipment (UE) to a target base station, wherein the core network node comprise:
  receiving means for receiving a Prioritized Algorithm List (PAL) from the network and storing said PAL, wherein the list is listing algorithms allowed for the UE in order of priority, for receiving UE security capabilities (SCAP) from the UE and for storing the UE SCAP, and for receiving UE SCAP related information of the UE from the target base station, where the UE SCAP have been reported from the source base station to said target base station previously during the handover procedure, and
  verifying means (703) for verifying the UE SCAP related information received from the target base station in order to detect a manipulated or defect base station by comparing at least part of the stored UE SCAP to the UE SCAP related information.

The core network node is typically a Mobility Management Entity (MME).

In case the same PAL is used for all UEs, a global PAL may be communicated from the network, either directly from the operation and maintenance system to each base station in the network and to a core network node, such as e.g. an MME, or it can be communicated to the core network node, which in turn distributes the global PAL to all base stations in the network.

It is also possible that the same PAL is sent to a certain part of the network, but that different parts of the network have different PALs. Alternatively, the PAL is unique for each UE, such that it may only contain algorithms that are known to be supported by the UE. In such a case, the UE unique PAL is distributed from the network to the target base station via the source base station.

Furthermore, since all base stations are aware of the correct priority order due to the PAL, the invention provides high granularity since in addition to detecting that the algorithm selected for use in the target cell does not lie in the set of allowed algorithms, it further detects bidding-down attacks among the algorithms within the set.

Furthermore, the suggested mechanism is simple to implement, since no separate configuration of the base station will be necessary. In addition, no new signaling procedures are required since all information associated with the suggested verification mechanism can be piggy-backed on already existing messages. For example, when the target base station sends a path-switch message to a core network node, such as an MME, it piggy-backs the UE SCAP received from the source base station on this message. At this point the core network node can verify that the UE SCAP received from the target base station matches the UE SCAP that is stored in the core network node. If there is a mismatch, the core network node can be configured to take one or more appropriate actions. The identity of the source eNB may also be piggy-backed on the path-switch message, so that the core network node will be able to determine which eNB that is misbehaving, or malfunctioning. The UE need not be involved in the described procedure, thereby reducing the required complexity of the terminal. The radio resources will also be more efficiently utilized when executing the suggested mechanism since no separate signaling between the terminal and the eNB is required for this purpose.

Other objects, advantages and novel features of the invention will become apparent from the following detailed description of the invention when considered in conjunction with the accompanying drawings

BRIEF DESCRIPTION OF THE DRAWINGS

The present invention will now be described in more detail by means of exemplary embodiments and with reference to the accompanying drawings, in which.

DETAILED DESCRIPTION

Figure 1:
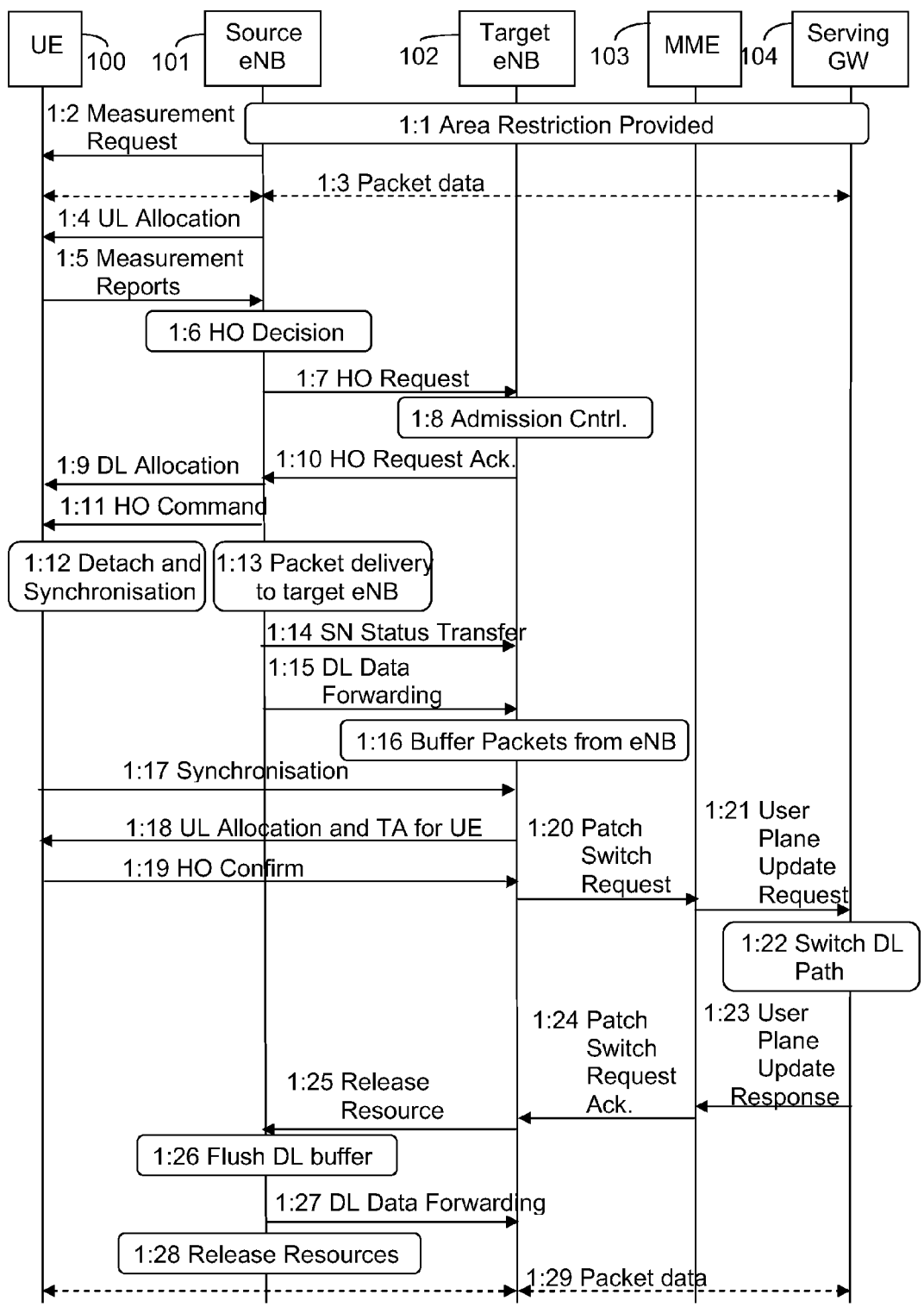
FIG. 1 is a signalling diagram, illustrating signalling associated with a handover procedure, according to the prior art.

Briefly described, the present invention refers to a method for detecting a manipulated or defect base station during a handover procedure. The present invention also refers to a core network node adapted to perform the suggested method, and a base station adapted to assist in the performing of the suggested method. It shall be noted that even though the description herein is provided in the setting of E-UTRAN, it is equally applicable to any system where a central network node provides a set of algorithm choices to any kind of radio base stations, selecting one or more of the algorithms for protection of the link between them and a UE. Therefore, the E-UTRAN setting below should only be regarded as one illustrative example of one application of the proposed invention. In particular it is noted that the particular messages mentioned in the examples in which information is passed between entities involved in a handover are only to be regarded as exemplifying examples, and, thus, that other alternative messages may be used instead.

One suggested method involving a handover of a UE session between two base stations, here referred to as eNBs, can be expressed according to the embodiment described below, wherein the method comprises the following main steps:

1. A list of allowed algorithms is provided to the eNBs of a communication network. This list is ordered according to a specific priority, wherein, typically, the algorithms with highest priority are most desirable for use. Henceforth, this list will be referred to as the Prioritized Algorithms List (PAL). The PAL may be a list that is unique per UE or globally used with all UEs.
2. When a UE connects to the network and provides its supported algorithms, i.e., UE security capabilities, from herein after referred to as UE SCAP, the serving eNB selects the algorithm with the highest priority according to the PAL supported by the serving eNB.
3. During handover, the source eNB provides the UE SCAP to the target eNB, and the target eNB selects the algorithm with the highest priority according to the PAL from the algorithms that are present in the UE SCAP and supported by the target eNB.
4. Subsequent to the handover, the UE and the target eNB uses the algorithm selected by the target eNB in step 3 in the following communication.
5. The target eNB reports the UE SCAP to the MME, which verifies that the source eNB has not manipulated the UE SCAP during the handover procedure.

It is of course possible that the compromised source eNB modifies the selected algorithm before giving it to the UE. This will however only result in that the target eNB and the UE will use different algorithms, and hence the connection will result in garbage. In such a situation the eNB would, according to current specifications in 3GPP, release the UE. The UE would respond by establishing a new connection as soon as it has data to send. Similarly, if the network has data to send to the UE, the UE would be paged. Hence the effects of such a scenario will not be lasting.

Although the example above refers to the selection of one algorithm, it is obvious to anyone skilled in the art that the described procedure can be used also to select several types of algorithms, intended for different purposes, e.g., one algorithm may be selected for integrity protection, while another one is selected for encryption purposes, using the same mechanism.

Below, method steps of the suggested detection mechanism will be described in more detail, referring to non-limiting examples.

As indicated above, the Prioritized Algorithms List (PAL) is a list of algorithms ordered according to how desirable they are for use. This list is typically configured by the operator of the network, and, depending on implementation choice, as will be explained in further detail below, it can be configured in different ways in different areas covered by the network.

Generally, there are two main cases for distribution of the PAL to the eNBs to consider. In the first case, the PAL is unique per UE. In such a case the PAL typically only contains algorithms that are known to be supported by the respective UE. This information can be derived from the UE SCAP of the respective UE and knowledge about wrongly implemented or deprecated algorithms, deduced from the UE's IMEI or similar. According to the described example, a UE unique PAL is distributed to the serving eNB when the UE context for the respective UE is established in the eNB. From hereinafter this type of PAL will be called a UE unique PAL.

Another case instead refers to a common PAL that is used with all UEs in the network. In such a scenario, the PAL can be distributed to any eNB at any time prior to establishment of a UE context in the eNB. From now on this type of PAL will be referred to as a global PAL.

Figure 2A:
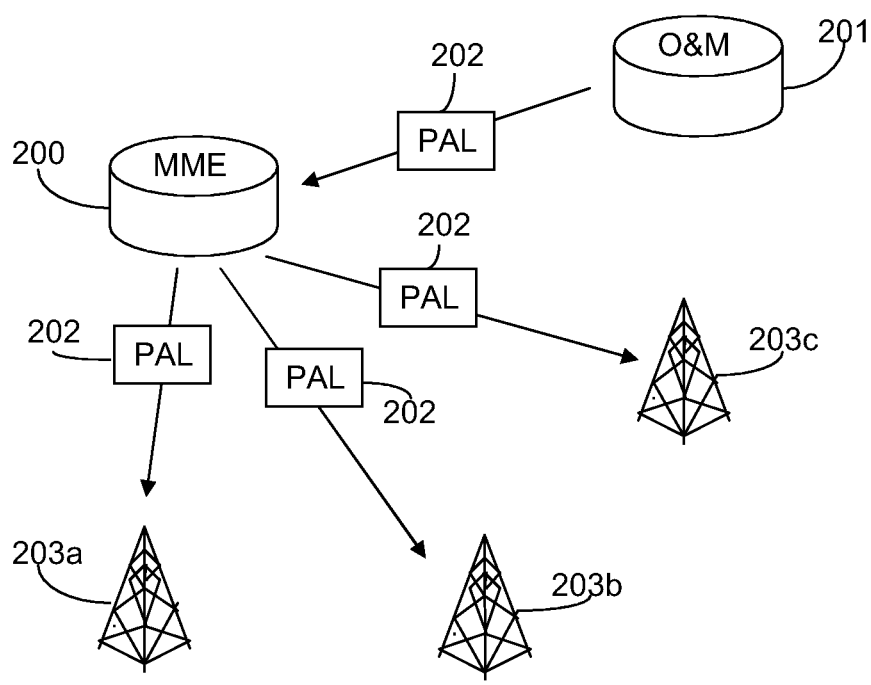
FIGS. 2a and 2b are simplified schemes, illustrating two alternative options for distributing a global Prioritized Algorithms List (PAL) to the base stations of a network.

There are several ways in which this type of PAL can be distributed to the eNBs of a communication network. One possible solution is illustrated in FIG. 2a. Depending on how security policy is handled in the network, it may be preferable to configure this list in the MME 200 via its O&M interface 201 and have the MME 200 distribute the PAL 202 to the eNBs 203a,b,c under its control.

Figure 2B:
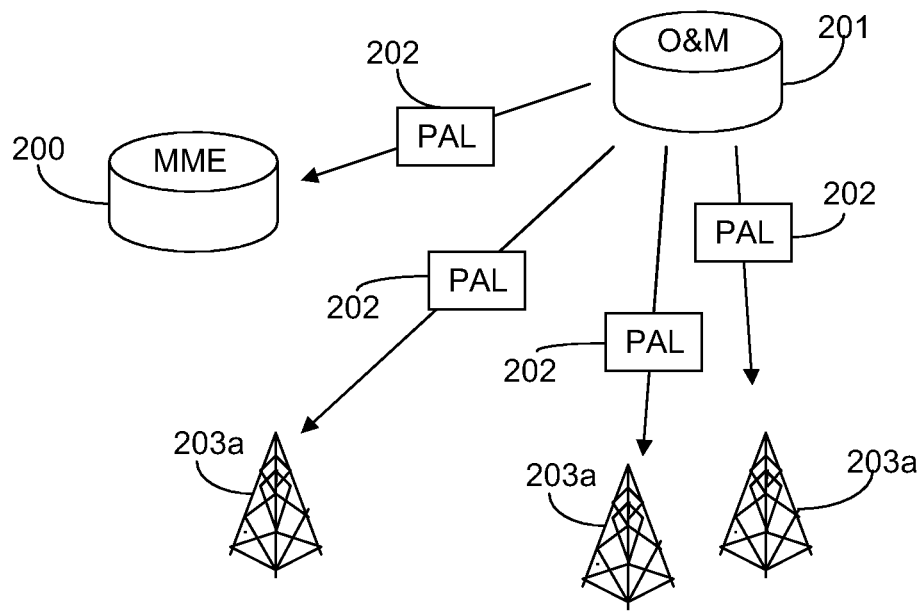

One alternative solution is shown in FIG. 2b, which illustrates how the O&M system 201 instead may be set to configure the eNBs 203a,b,c directly with the PAL 202.

When a UE attaches to the network or becomes known for the first time in an MME, e.g. because of a MME-relocation or IDLE mode mobility, it will inform the MME of the network about its UE SCAP or the MME will retrieve the UE SCAP from the MME that the UE was previously connected to.

Figure 3:
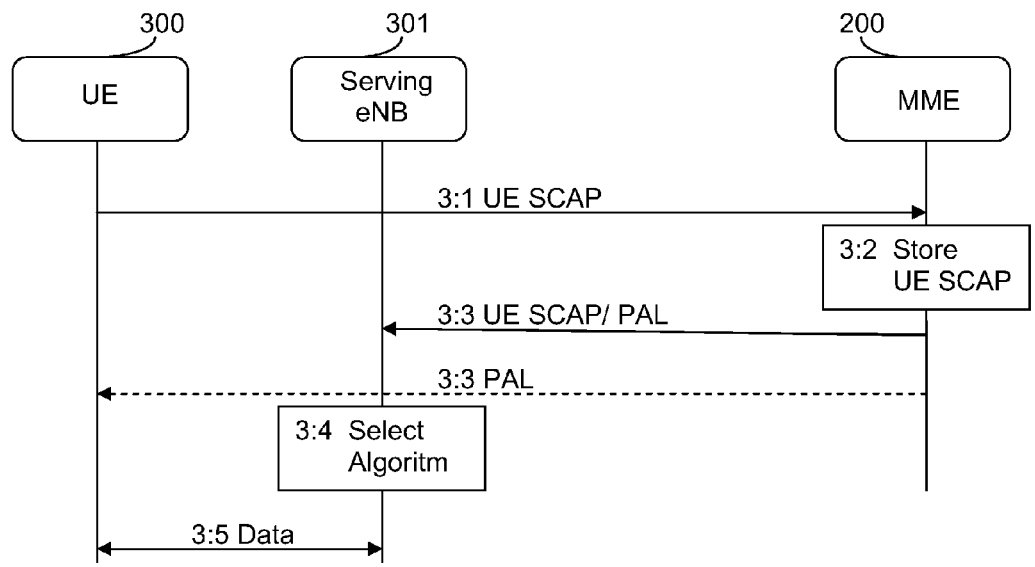
FIG. 3 is a signalling diagram, illustrating how a UE SCAP can be distributed, according to one embodiment.

FIG. 3 shows such a principle, according to one embodiment, where the UE SCAP of a UE 300 ends up in a serving eNB 301 when the UE 300 establishes security with it. In a first step 3:1 UE 300 transmits the UE SCAP to MME 200. The MME stores the UE SCAP in a storing means, as indicated with a next step 3:2, and in a subsequent step 3:3 the UE SCAP is provided to the serving eNB 301. As will be explained below the transfer of the UE SCAP from the MME 200 to the eNB 301 may be implicit, if e.g. the UE SCAP is used to filter a UE unique PAL. In such a case the filtered PAL would also be provided to serving eNB 301 in step 3:3. As indicated in an optional step 3:3, a UE unique PAL may also be distributed to UE 300 in a message secured between the MME 200 and UE 300, e.g. via a NAS Security Mode Command.

Based on the UE SCAP, and the PAL, delivered in step 3:3, the serving eNB 301 selects algorithm, as indicated in a next step 3:4. After the algorithm has been selected, UE 300 and the serving eNB 301 can exchange data that will be protected by the selected algorithm. This is illustrated as a data transmission procedure, indicated with a final step 3:5.

Also when using a global PAL, the MME may modify the UE SCAP in order to block one or more algorithms for a certain UE. In such a scenario, the MME 200 may send the modified UE SCAP to the serving eNB 301 in step 3:3, while the original UE SCAP is sent to the UE 300.

In cases of MME relocation at a handover, the source MME may provide the target MME with the UE SCAP, and in this case there is of course no need for the UE to send them to the network again. This only serves as an example of how the information is passed from the UE to the network. The important thing to note is that the MME stores the SCAP for the UE.

During an inter-eNB handover the source eNB will be transferring the UE SCAP to the target eNB in a handover request command, as indicated in the previously referred TS 36.300.

Figure 4:
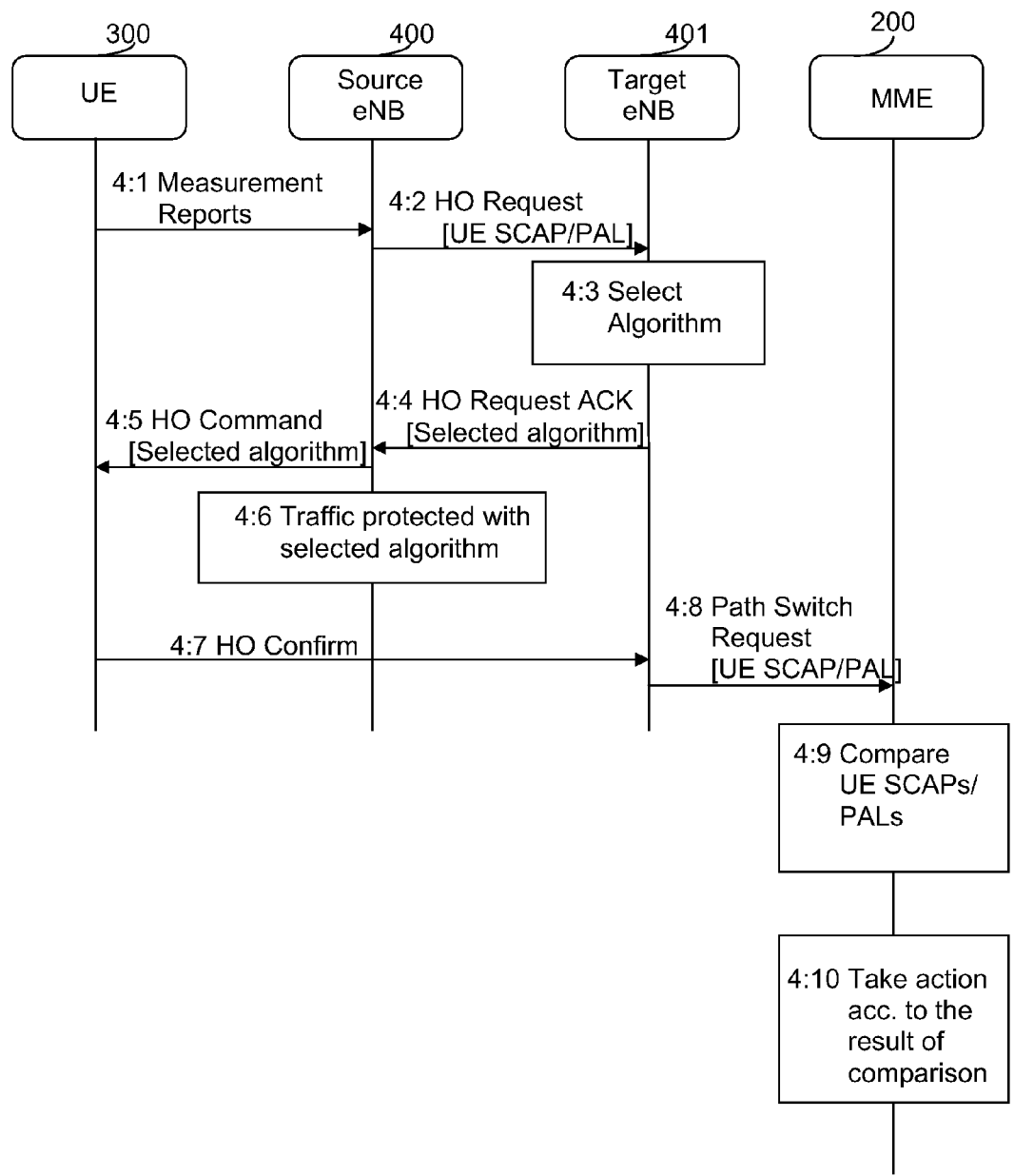
FIG. 4 is a signalling diagram, illustrating a handover procedure comprising steps for detecting a malicious source eNB, according to one embodiment.

For a malicious eNB to trick the target eNB into using a less desirable algorithm than it would chose if the source eNB was well behaved, the only possibility is to modify the UE SCAP, or the PAL in case the PAL is a UE unique PAL. A procedure for detecting a malicious source eNB during a handover, according to one embodiment, will therefore now be described in more detail with reference to FIG. 4.

In a first step 4:1, which corresponds to step 1:1 of FIG. 1, measurement reports are forwarded from UE 300 to the source eNB 400. Based on these reports, source eNB 400 sends a handover (HO) request to a target eNB 401, as indicated with a next step 4:2. The HO request will comprise the UE SCAP, previously transmitted to eNB 400 from MME or from another eNB if the eNB 400 was acting as a target eNB in a previous handover. As mentioned earlier, the HO request may also comprise the PAL in addition to the UE SCAP. If the PAL and/or the UE SCAP is provided to eNB 400 as a hash value, the relevant hash value of the PAL and/or the UE SCAP will be transmitted in the HO request instead of the actual lists. On the basis of the PAL and/or the UE SCAP, the target eNB 401 selects algorithm under the assumption that the source eNB is well behaved, as indicated with another step 4:3.

The target eNB 401 responds to eNB 400, now representing the source eNB, with a HO request acknowledgement, comprising an indication of the selected algorithm. This is indicated with a step 4:4 in FIG. 4. In a next step 4:5, the source eNB 400 transmits a handover command, comprising an indication of the selected algorithm, to UE 300. As indicated with another step 4:6, the traffic between UE 300 and the target eNB 401 will from now on be protected with the selected algorithm. UE 300 then confirms the executed handover to the target eNB 401, in a next step 4:7. Once the handover has been completed from the radio network point of view, the target eNB 401 sends a path switch message, typically a path switch request, comprising the UE SCAP to MME 200 to inform the MME that UE 300 has changed location. This is indicated with a step 4:8. The UE SCAP may be piggy-backed on the path-switch message. If the target eNB 401 did not have a PAL prior to the HO procedure, or if the PAL is UE unique, i.e. the PAL was filtered by the MME 200, using the UE SCAP in order to create a UE unique PAL, and, hence, was provided to the target eNB 401 from the source eNB 400 in step 4:2, also the PAL is added to the path-switch message. The reason for doing this is to be able to verify that the PAL has not been manipulated by the source eNB. As mentioned above, hash values representing the respective PAL and/or UE SCAP may be added to the path-switch message instead of the respective list. If the UE SCAP previously sent to the serving eNB was a modified UE SCAP, this modified UE SCAP is sent to the target eNB 401 in step 4:2 and to the MME 200 in step 4:8.

When the MME 200 has retrieved the path-switch message from the target eNB 401, it can verify that the UE SCAP is the same as what is already stored in the MME, as indicated with a step 4:9, and, in case the UE unique PAL was also sent, that it matches the copy of the PAL stored at the MME. If any of these checks fail, the MME can take an appropriate action, as indicated with a subsequent step 4:10. Such an appropriate action may comprise e.g. to release the UE from the network, log the event and raise an alarm to the O&M system.

According to another, alternative embodiment, the proposed solution may be made even more efficient by replacing the reporting of the UE SCAP, and possibly also the PAL, with a hash value of the UE SCAP, and PAL if applicable, instead of reporting the respective values as such to the MME. In such a case the UE SCAP/PAL is/are hashed by the target eNB 401, and instead of the UE SCAP/PAL the hash value/s is/are sent to MME 200 in the path switch request in step 4:8 and the comparison made in step 4:9 is made on the basis of the hash values of the respective PAL and/or UE SCAP.

The size of the hash value may be chosen to be just large enough to obtain a sufficiently low probability of an undetected erroneous UE SCAP. Typically the number of bits for the hash value is selected to be less than the compressed UE SCAP itself. The MME may retain also the hash value of the initial UE SCAP. In this setup only the two hash values of the UE SCAPs need to be compared and not the actual UE SCAP themselves. A similar trick can be utilized in case the PAL need to be sent from the target eNB to the MME.

In case, through pre-computations, it is discovered by the MME 200 that two different UE SCAPs have the same hash value the MME may be configured to hash the UE SCAP and an offset that the MME selects, e.g. UE SCAP concatenated with a 32 bit string, here referred to as the MME_OFFS string. The MME_OFFS string is then sent by the MME 200 to the serving eNB 301 together with the UE SCAP or PAL in step 3:3 of FIG. 3. This string is then sent together with the respective UE SCAP or PAL in steps 4:2 and 4:8 of FIG. 4, before it is used also in the comparison step 4:9, thereby enabling distinguishing of the different lists from each other.

Security may be strengthened even more if the offset value is reported back to the MME by the target eNB together with the hash of the UE SCAP and offset in step 4:8. Even a string combined in accordance with this alternative embodiment may be shorter than the UE SCAP list itself.

The hash values may be generated and identified using any conventional technique, and, thus, these procedures will not be described in any further detail in this document. Examples of suitable hash functions may be e.g. any truncated version of SHA1, RIPEMD-160, enabling a truncation of the output string of the hash function.

It may also be of interest to know which eNB that has manipulated any of the lists. This can be accomplished by also including the identity (eNB ID) of the source eNB in the path-switch request sent in step 4:8. Alternatively, the MME may be able to identify the source eNB in another way than via this message. When the eNB ID of the source eNB is provided to the MME, such information should be handled with care though. Instead of automatically banning an eNB from the network that seems to be erroneous on the basis of an eNB ID, the information should preferably be registered and the eNB should be checked. The reason for this is that a malicious eNB may send a faked path-switch message to ban well behaved eNBs. It therefore seems more appropriate e.g. to raise an alarm and to send out a field technician to check the suspected source eNB.

Figure 5:
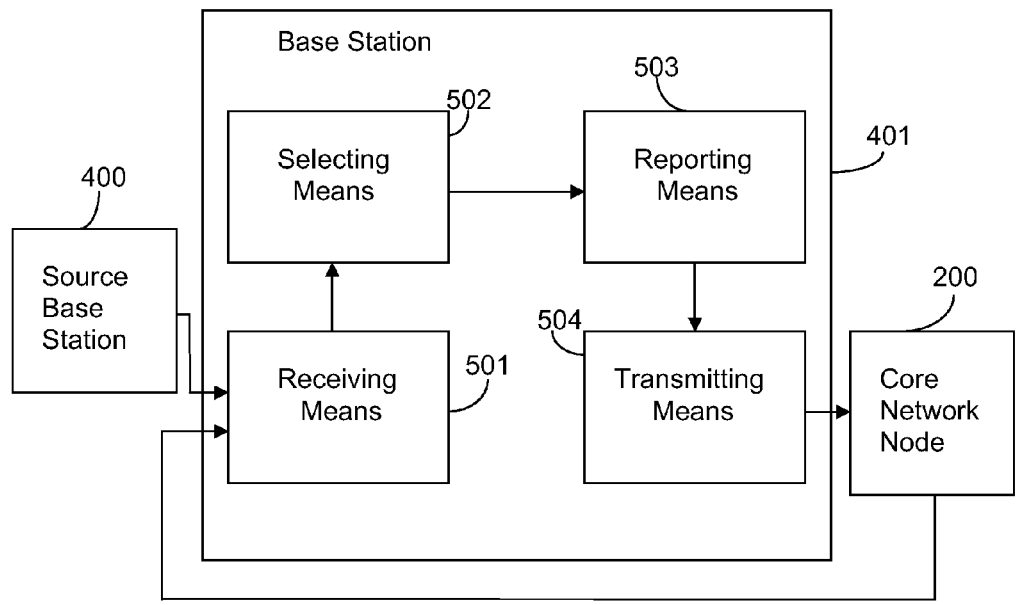
FIG. 5 is a block diagram, illustrating a base station, adapted to execute the handover procedure of FIG. 4, according to one embodiment.

A base station, typically an eNB, which will assist a core network node, typically a MME, to identify a malicious source eNB according to the procedural steps mentioned above, will have to be adapted accordingly. Such a base station, capable of operating or acting as a target base station, according to one exemplary embodiment, will now be described in more detail with reference to FIG. 5.

It is to be understood that, in addition to the base station means described in this example which are adapted for providing target base station functionality to the base station, the base station also comprise additional conventional means, enabling the base station to handle additional base station related tasks, including to operate as a source base station, all according to current circumstances. However, for simplicity reasons any means which are not necessary for the understanding of the mechanisms which are in presented in this document, have been omitted. The base station 401 comprises a conventional receiving means 501, adapted to receive a HO request, comprising PAL and/or UE SCAP from a source base station 400. The receiving means 501 may also be adapted to receive a global PAL from a core network node 200, such as an MME. The base station 401 also comprises a selecting means 502, adapted to select one of the algorithms that it supports, on the basis of the information provided to the receiving means 501, and, if the PAL was received previously from the MME 200, on the basis also of this information.

Once the selecting means 502 has selected an algorithm, it is adapted to initiate a reporting of the respective information provided to the selecting means, i.e. the PAL and/or UE SCAP, to the MME. The reporting is performed by a reporting means 503, which transmits the information to the MME via a path switch request, via a conventional transmitting means 504. The reporting means 503 of a base station is also configured to provide a UE SCAP/PAL for a UE that is handed over from the base station to a target base station when the base station is acting as a source base station, as indicated with step 4:2 in FIG. 4.

If reporting of hash values is to be applied, the reporting means is also adapted to provide a hash value of a UE SCAP/ PAL, that is reported to the core network node 200 via the transmitting means 504. Such a hashing functionality may be provided using any conventional technique adapted therefore.

Figure 6:
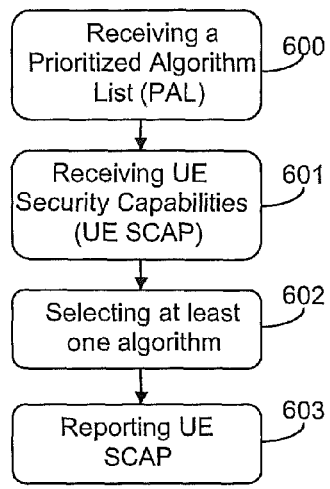
FIG. 6 is a flow chart, illustrating the steps executed by a target base station assisting in a detection of a manipulated or defect base station, according to one embodiment.

The function of the base station described above when assisting a core network node in a detection of a manipulated or defect base station can be illustrated with a block diagram, as illustrated with FIG. 6.

In a first step 600, the base station receives a PAL, which may be a global PAL, transmitted to all base stations of the network prior to the handover, or a PAL transmitted from a source base station during a handover procedure, such as the one described above, with reference to FIG. 4.

In a next step 601, the base station receives a UE SCAP from the UE on which the handover is to be performed. In a subsequent step 602, the base station uses the PAL and the UE SCAP to select one or more algorithms. In a final step 603, the base station reports the UE SCAP, and possibly also the PAL, to the MME, enabling the MME to use this information for the required verification purposes.

Figure 7:
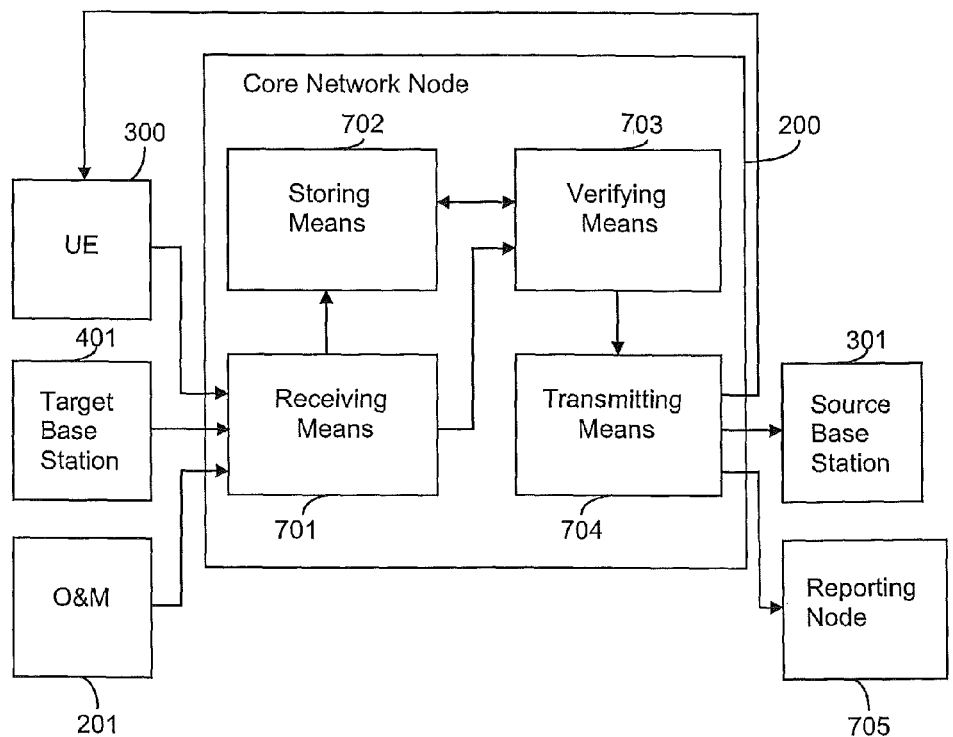
FIG. 7 is a block diagram, illustrating a core network node, adapted to be able to detect a manipulated or defect base station, according to one embodiment.

Also the core network node, in the described embodiments exemplified as an MME, will have to be adapted accordingly, and thus, such a core network node, according to one exemplified embodiment, will now be described in further detail with reference to FIG. 7. In resemblance to the base station, also the described architecture of the core network node is simplified so as to omitting any means which are not necessary for the understanding of the discovery mechanisms at focus in this document.

The core network node 200, comprises a conventional receiving means 701, adapted to receive a UE SCAP both from a UE 300 and a target base station 401. The receiving means is also adapted to receive a PAL from the network, as indicated above, with reference to either FIG. 2a or 2b. The core network node 200 also comprises a storing means 702 for storing a UE SCAP that has been received from a UE as described above. A UE SCAP received from a target base station 401 is forwarded to a verifying means 703, which is adapted to compare the received value with the corresponding stored value. The core network node 200 also comprises a transmitting means 704, adapted to communicate with a serving base station, as indicated above with reference to FIG. 2a or 2b. If hash values are used, the verifying means 703 according to the exemplified embodiment is also adapted to generate a respective hash value for the PAL and/or UE SCAP of a specific UE. Such a verifying means is further adapted to compare a hash value received from a target base station to the corresponding hash value of a stored UE SCAP or a PAL. In addition, the verifying unit may also be adapted with functionality for identifying identical hash values, as well as, functionality for generating offset values for distinguishing the hash values from each other, and, at a later stage, for comparing such values. As indicated above, such generating and comparing functionality, as well as functionality for handling offset values, may be provided using any conventional technique, and, thus, this technique is not described any further in this exemplified core network node architecture. Depending on the outcome from a processing of information provided to the core network node in a path switch request, the transmitting means may be adapted to communicate with any other appropriate node, wherein the verifying means 703 may be configured to generate and to forward one or more messages to a reporting node 705 in order to enable appropriate further processing to be executed, following the detection of a suspected erroneous or manipulated base station.

Figure 8:
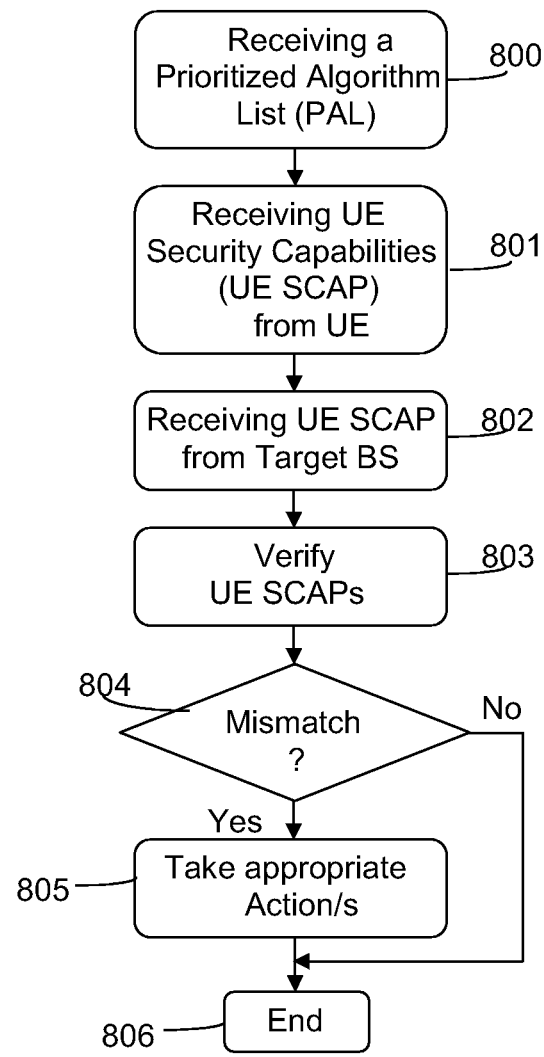
FIG. 8 is a flow chart, illustrating steps to be executed by a core network node for detecting a manipulated or defect base station, according to one embodiment.

In FIG. 8 a block scheme illustrates the operation of a core network node according to one exemplary embodiment in more detail. In a first step 800 the core network node 200 receives and stores a PAL, typically from an O & M, as described previously.

In a next step 801 the node receives and stores a UE SCAP from a UE. When the UE is about to experience a HO, the network node also receives a UE SCAP from the target base station, as indicated in a next step 802. Both UE SCAPs are compared in another step 803. If a mismatch is recognized, as indicated with a step 804, the core network node takes appropriate actions, as indicated with the conditional step 805, while the procedure terminates with a final step 806 if the comparison turns out successfully.

The present embodiments are to be considered in all respects as illustrative and not restrictive. It is therefore to be understood that the present invention may also be carried out in other ways than those specifically set forth herein without departing from essential characteristics of the invention.

ABBREVIATION LIST eNB LTE radio base station
LTE Long Term Evolution
MME Mobility Management Entity
NAS Non Access Stratum
O&M Operation and Maintenance
PAL Prioritized Algorithms List
SCAP UE Security CAPabilities
UE User Equipment

The invention claimed is:

1. A method performed by a target base station of a communication network for detecting a manipulated or defective status of a source base station in connection with a handover of a user equipment (UE), said method comprising:
receiving a prioritized algorithm list (PAL) from the network, said list listing algorithms allowed for use when communicating with said UE in order of priority;
receiving UE security capabilities (SCAP) related information from the source base station for the UE that is handed over between the source and target base stations;
selecting at least one algorithm having the highest priority according to the PAL out of the algorithms allowed for use when communicating with said UE in response to said UE SCAP related information; and
reporting the received UE SCAP related information to a core network node that has knowledge of the UE SCAP of said UE and that is configured to use the reported UE SCAP related information to detect whether the source base station has a manipulated or defective status.

2. The method according to claim 1, wherein said PAL is a global PAL.

3. The method according to claim 2, further comprising distributing said global PAL to the source and target base stations from a network Operation & Maintenance system.

4. The method according to claim 2, further comprising distributing said global PAL to the source and target base stations via the core network node.

5. The A method according to claim 1, wherein said PAL is unique to said UE.

6. The method according to claim 5, further comprising distributing the UE unique PAL to the target base station via the source base station.

7. The method according to claim 1, wherein said reporting further comprises reporting the PAL to the core network.

8. A target base station of a communication network for detecting a manipulated or defective status of a source base station in connection with a handover of a user equipment (UE), said target base station comprising:
receiving circuitry that is configured for receiving a prioritized algorithm list (PAL) from the network, said list listing algorithms allowed for use when communicating with said UE in order of priority and for receiving UE security capabilities (SCAP) related information from the source base station for the UE that is handed over between the two base stations;
selecting circuitry that is configured for selecting at least one algorithm from the PAL having the highest priority according to the PAL out of the algorithms allowed for use when communicating with said UE in response to said UE SCAP related information and that is supported by said base station; and
reporting circuitry that is configured for reporting, via a transmitting circuit, the received UE SCAP related information to a core network node that has knowledge of the UE SCAP of said UE and that is configured to use the reported UE SCAP related information to detect whether the source base station has a manipulated or defective status.

9. The target base station according to claim 8, wherein the target base station comprise an enhanced node B (eNB).

* * * * *

UNITED STATES PATENT AND TRADEMARK OFFICE
CERTIFICATE OF CORRECTION

| | | |
|---|---|---|
| PATENT NO. | : 8,620,267 B2 | Page 1 of 1 |
| APPLICATION NO. | : 12/922314 | |
| DATED | : December 31, 2013 | |
| INVENTOR(S) | : Norrman et al. | |

It is certified that error appears in the above-identified patent and that said Letters Patent is hereby corrected as shown below:

In the Claims:

In Column 12, Line 19, in Claim 5, delete "The A" and insert -- The --, therefor.

Signed and Sealed this
Fifteenth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,620,267 B2
APPLICATION NO. : 12/922314
DATED : December 31, 2013
INVENTOR(S) : Norrman et al.

It is certified that error appears in the above-identified patent and that said Letters Patent is hereby corrected as shown below:

On the Title Page, item (73), under "Assignee", in Column 1, Line 1, delete "Ericssion" and insert -- Ericsson --, therefor.

Signed and Sealed this
Thirtieth Day of September, 2014

Michelle K. Lee
*Deputy Director of the United States Patent and Trademark Office*